United States Patent
Upasani et al.

(10) Patent No.: US 11,825,760 B2
(45) Date of Patent: Nov. 28, 2023

(54) PATH PLANNING SYSTEM AND METHOD FOR DEFINING A HARVEST PATH FOR HARVESTING A CROP MATERIAL FROM A FIELD

(71) Applicant: DEERE & COMPANY, Moline, IL (US)

(72) Inventors: Sameer Subhash Upasani, Pune (IN); Kedarnath Shivsharan Rugge, Pune (IN)

(73) Assignee: DEERE & COMPANY, Moline, IL (US)

( * ) Notice: Subject to any disclaimer, the term of this patent is extended or adjusted under 35 U.S.C. 154(b) by 205 days.

(21) Appl. No.: 17/643,955

(22) Filed: Dec. 13, 2021

(65) Prior Publication Data
US 2023/0180649 A1    Jun. 15, 2023

(51) Int. Cl.
| | | |
|---|---|---|
| A01B 69/00 | (2006.01) | |
| A01B 69/04 | (2006.01) | |
| G05D 1/00 | (2006.01) | |
| G05D 1/02 | (2020.01) | |

(52) U.S. Cl.
CPC ......... *A01B 69/008* (2013.01); *G05D 1/0016* (2013.01); *G05D 1/0217* (2013.01); *G05D 1/0219* (2013.01); *G05D 2201/0201* (2013.01)

(58) Field of Classification Search
CPC .................................................. A01B 69/008
See application file for complete search history.

(56) References Cited

U.S. PATENT DOCUMENTS

| | | | |
|---|---|---|---|
| 10,390,492 B2 | 8/2019 | Kraus | |
| 10,820,477 B2* | 11/2020 | Dix | A01B 63/008 |
| 11,044,842 B2* | 6/2021 | Graf Plessen | A01B 69/008 |
| 2002/0072850 A1* | 6/2002 | McClure | A01B 69/008 |
| | | | 701/25 |
| 2003/0187560 A1 | 10/2003 | Keller et al. | |
| 2017/0127606 A1* | 5/2017 | Horton | G06T 17/05 |
| 2019/0208695 A1* | 7/2019 | Graf Plessen | A01B 69/007 |

(Continued)

FOREIGN PATENT DOCUMENTS

| | | | | |
|---|---|---|---|---|
| CN | 106416466 A | * | 2/2017 | ............. A01B 33/02 |
| CN | 106817943 B | * | 11/2018 | |
| CN | 109154981 A | * | 1/2019 | ............. B60W 10/20 |

(Continued)

OTHER PUBLICATIONS

Extended European Search Report and Written Opinion issued in European Patent Application No. 22211410.0, dated May 15, 2023, in 08 pages.

*Primary Examiner* — Shelley Chen

(57) ABSTRACT

A path planning system includes a path planning algorithm operable to receive a desired harvest width for each pass of a harvester implement, and a boundary of a harvest area to be harvested. The path planning algorithm determine a surface elevation of the harvest area within the boundary, which includes at least one elevation contour establishing a line of constant elevation. The path planning algorithm then defines a harvest path for the harvester implement to follow while harvesting the crop material. The harvest path is defined to substantially parallel the at least one elevation contour, and is incremented in elevation in a parallel manner based on the desired harvest width.

18 Claims, 5 Drawing Sheets

(56) References Cited

U.S. PATENT DOCUMENTS

2020/0029487 A1\* 1/2020 Dix ........................ A01C 7/203

FOREIGN PATENT DOCUMENTS

| | | | | |
|---|---|---|---|---|
| CN | 108806371 B | \* | 6/2020 | ........... G09B 19/167 |
| CN | 109154981 B | \* | 4/2022 | ............. B60W 10/20 |
| EP | 1915894 A2 | | 4/2008 | |
| EP | 2116121 A1 | | 11/2009 | |
| EP | 3384243 A1 | | 10/2018 | |
| EP | 3622798 A1 | \* | 3/2020 | ......... A01D 34/8355 |
| EP | 3628779 A1 | \* | 4/2020 | ................ E01H 4/02 |
| EP | 3384243 B1 | \* | 5/2020 | ........... A01B 69/007 |
| WO | WO-2020028132 A1 | \* | 2/2020 | ........... A01B 63/008 |
| WO | WO 2020028132 A1 | | 2/2020 | |

\* cited by examiner

PATH PLANNING SYSTEM AND METHOD FOR DEFINING A HARVEST PATH FOR HARVESTING A CROP MATERIAL FROM A FIELD

TECHNICAL FIELD

The disclosure generally relates to a path planning system and a method for defining a harvest path or route for a harvester implement to follow while harvesting a crop material from a field.

BACKGROUND

While harvesting a crop material from a field, a harvester implement follows a harvest path. The harvest path is the path or route that the harvester implement follows while harvesting the crop material. The harvest path may be followed during crop cutting, mowing, raking, collecting, or other harvest operations. Often, the harvest path consists of following a generally back-and-forth route that parallels at least one edge of the field. The harvest path may be determined by the operator based on prior experience and knowledge. In other implementations, particularly when automated and/or autonomous operation of the harvester implement is utilized, a computing device may analyze the perimeter and/or boundary of the field, and define the harvest path. The computing device may define the harvest path using an algorithm that minimizes a horizontal and/or overall travel distance and/or that minimizes vehicle movement across the harvest area.

SUMMARY

A path planning system for harvesting a crop material is provided. The path planning system includes a computing device including a processor and a memory having a path planning algorithm stored thereon. The processor is operable to execute the path planning algorithm. The path planning algorithm receives a harvest swath width input, and a boundary input. The harvest swath width input defines a desired harvest width for each pass of a harvester implement. The boundary input defines a boundary of a harvest area to be harvested. The path planning algorithm determine a surface elevation of the harvest area within the boundary. The surface elevation includes at least one elevation contour establishing a line of constant elevation. The path planning algorithm then defines a harvest path for the harvester implement to follow while harvesting the crop material. The harvest path is defined to substantially parallel the at least one elevation contour, and is based on the harvest swath width input.

In one aspect of the disclosure, the processor may be operable to execute the path planning algorithm to define a line segment that extends across the surface elevation in a direction substantially perpendicular to the at least one elevation contour. The path planning algorithm may then calculate a slope of the line segment, and compare the slope of the line segment to a maximum allowable slope threshold. The slope of the line segment generally represents a cross slope of the ground surface. The maximum allowable slope threshold may represent a maximum cross slope on which the harvester implement may safely operate. The slope of the line segment is compared to the maximum allowable slope threshold to determine if the slope of the line segment is equal to or less than the maximum allowable slope threshold, or if the slope of the line segment is greater than the maximum allowable slope threshold. When the slope of the line segment is greater than the maximum allowable slope threshold, the path planning algorithm may re-define the harvest path to traverse one of a more uphill route or a more downhill route relative to the at least one elevation contour. The path planning algorithm may redefine the harvest path so that the harvest path does not traverse a cross slope that is greater than the maximum allowable slope threshold.

In one implementation of the disclosure, the computing device may include a portable handheld device. The portable handheld device may include, but is not limited to, a smart phone, a tablet, a laptop computer, or a specialized computing device. In one aspect of the disclosure, the computing device may include a data transmitter. The processor may be operable to execute the path planning algorithm to communicate the harvest path to the harvester implement. In another implementation of the disclosure, the computing device may be integrated into the harvester implement.

In one implementation of the disclosure, the memory may include elevation data of a region including the harvest area. The elevation data may be stored in the memory of the computing device. The memory may further include geographic data of the region including the harvest area stored thereon. The path planning algorithm may receive a geographic location input from an operator. The geographic location input includes a geographic location associated with and/or identifying the location of the boundary and/or the harvest area. Using the geographic location input, the path planning algorithm may access the elevation data and the geographic data stored on the memory of the computing device to determine the surface elevation of the harvest area.

In one implementation, the computing device may include a position sensor. The processor is operable to execute the path planning algorithm to receive a position signal from the position sensor. The position signal includes data indicating a current geographic location of the computing device, which may be used to locate the harvest area and/or the boundary of the harvest area. The computing device may further include a data receiver. The processor is operable to execute the path planning algorithm to receive elevation data via the data receiver. The elevation data provides the surface elevation or data enabling the computing device to calculate or otherwise determine the surface elevation of the harvest area.

In one aspect of the disclosure, the processor is operable to execute the path planning algorithm to define the harvest path to include an overall elevation gain of the harvest path that is less than an overall elevation gain of an alternative harvest path arranged substantially perpendicular to the at least one elevation contour. The alternative harvest path arranged substantially perpendicular to the at least one elevation contour may result in the harvester implement ascending and descending a hill multiple times. By defining the harvest path to parallel the at least one elevation contour, and incrementally increasing or decreasing the elevation of the harvest path while remaining substantially parallel with the at least one contour, the harvester implement may only ascend a hill once. Accordingly, the total or overall elevation gain of the harvester implement along the defined harvest path may be less than the elevation gain along the alternative harvest path. Because it requires more energy to ascend a hill than to traverse flat ground or to descend a hill, reducing the overall elevation gain of the harvester implement reduces the energy, e.g., carbon based fuel or electric energy, required to harvest the crop material from the harvest area.

In one aspect of the disclosure, the path planning algorithm may define the harvest path to increment from substantially parallel to a first elevation contour to substantially parallel to a second elevation contour. The second elevation contour is generally parallel with the first elevation contour and is spaced one desired harvest width from the first elevation contour. As such, the harvest path on the second elevation contour is positioned immediately adjacent to the harvest path on the first elevation contour, such that the desired harvest width of each pass does not overlap each other.

A method of harvesting a crop material from a harvest area with a harvester implement is also provided. The method includes receiving a harvest swath width input with a computing device. The harvest swath width input defines a desired harvest width for each pass of the harvester implement. A boundary input is also received with the computing device. The boundary input defines a boundary or perimeter of a harvest area. The computing device may then determine a surface elevation of the harvest area within the boundary. The surface elevation includes at least one elevation contour establishing a line of constant elevation. The computing device may then define a harvest path for the harvester implement. The harvest path is a path or route the harvester implement may follow while harvesting the crop material within the harvest area. The harvest path is defined to substantially parallel the at least one elevation contour based on the harvest swath width input.

In one aspect of the disclosure, the computing device may define a line segment that extends across the surface elevation in a direction substantially perpendicular to the at least one elevation contour. The computing device may then calculate a slope of the line segment, and compare the slope of the line segment to a maximum allowable slope threshold. The slope of the line segment is compared to the maximum allowable slope threshold to determine if the slope of the line segment is equal to or less than the maximum allowable slope threshold, or if the slope of the line segment is greater than the maximum allowable slope threshold. When the slope of the line segment is greater than the maximum allowable slope threshold, the computing device may re-define the harvest path to traverse one of a more uphill route or a more downhill route relative to the at least one elevation contour.

In one aspect of the disclosure, the step of defining the harvest path includes defining the harvest path to include an overall elevation gain of the harvest path that is less than an overall elevation gain of an alternative harvest path arranged substantially perpendicular to the at least one elevation contour. By doing so, because ascending a hill requires significantly more energy than traversing flat ground and/or descending a hill, an amount of energy required to move the harvester implement through the harvest area to harvest the crop material may be reduced.

In one aspect of the disclosure, the step of defining the harvest path includes defining the harvest path to increment from substantially parallel to a first elevation contour to substantially parallel to a second elevation contour. The second elevation contour is generally parallel with the first elevation contour, and is spaced one desired harvest width from the first elevation contour so that the edge of the desired harvest width associated with the first elevation contour does not overlap the desired harvest width associated with the second elevation contour.

In one aspect of the disclosure, the computing device may include a portable handheld device having a data transmitter. The portable handheld device may include, but is not limited to, a smart phone, a tablet, a laptop computer or some other specialized computing device. The method may further include communicating the harvest path to the harvester implement with the data transmitter.

Accordingly, the path planning system and method of harvesting the crop material described herein may reduce the amount of energy required to move the harvester implement through the harvest area, by reducing the overall elevation gain of the harvest path. Additionally, in some applications in which the crop material is gathered and formed into a bale, particularly a round bale, the bale may be discharged from the baler implement in a direction that is parallel with the elevation contour, i.e., in a direction perpendicular to a cross slope of the ground surface, thereby reducing the chance that the bale may roll down hill.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
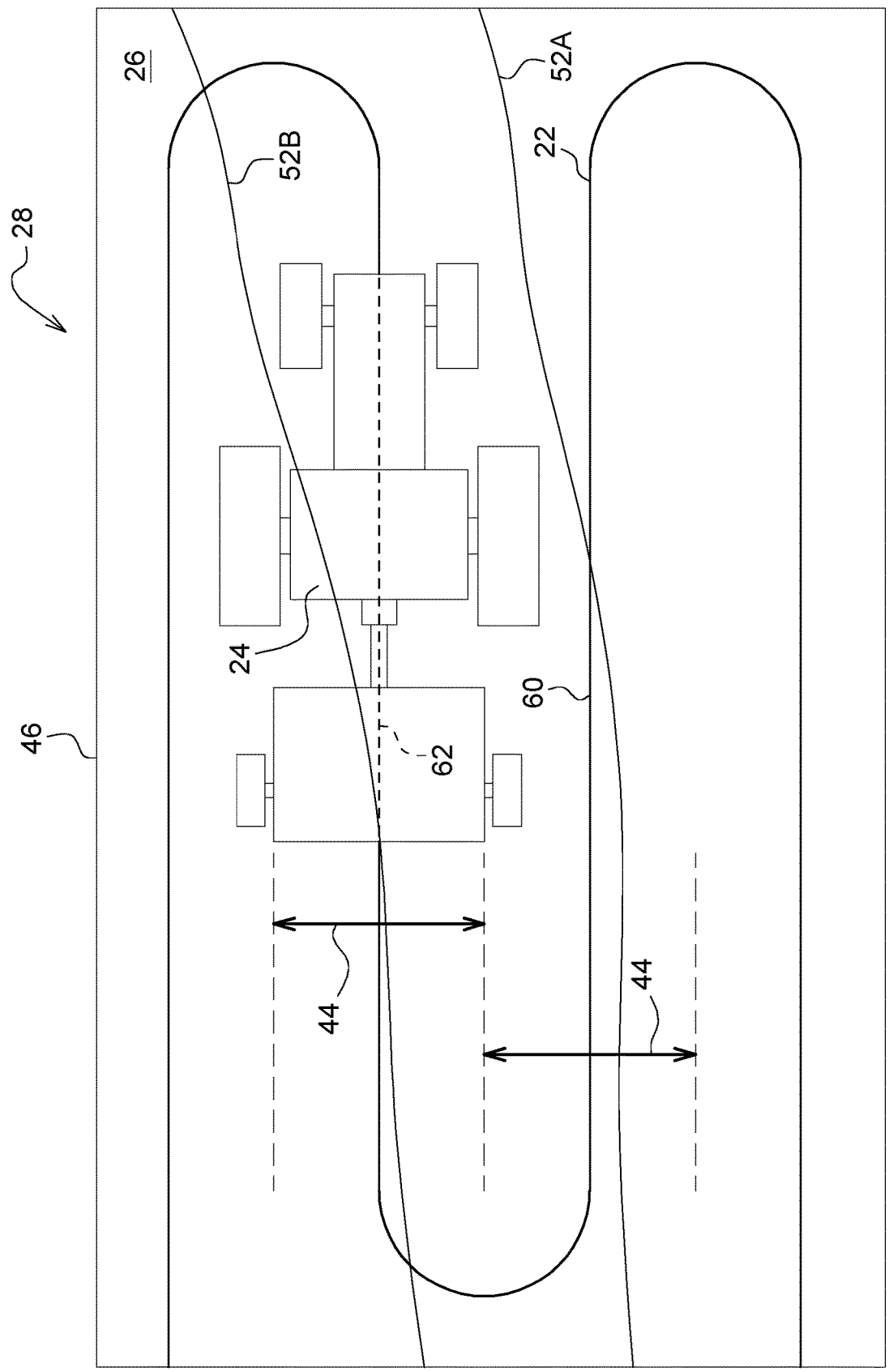
FIG. 1 is a schematic plan view of a field showing a harvest area and a harvester implement following a harvest path.

Referring to the Figures, wherein like numerals indicate like parts throughout the several views, a path planning system is generally shown at 20. Referring to FIG. 1, the path planning system 20 defines a harvest path 22 for a harvester implement 24 to follow when harvesting a crop material 26 from a harvest area 28 of a field. The harvest path 22 may be followed for any number of harvest operations. For example, the harvest path 22 may be defined and followed for cutting, mowing, raking, collecting, and/or processing the crop material 26. In one implementation, the crop material 26 may be cut, collected and processed in a single pass following the harvest path 22. In another implementation, the crop material 26 may be cut in a first pass following the harvest path 22, raked and/or merged into a windrow in a second pass following the harvest path 22, and/or collected and/or baled in a third pass following the harvest path 22. Additionally, the harvest path 22 may be redefined between passes, such as if the crop material 26 is raked and/or merged into a windrow located in a different position then when the crop material 26 was originally positioned.

Figure 2:
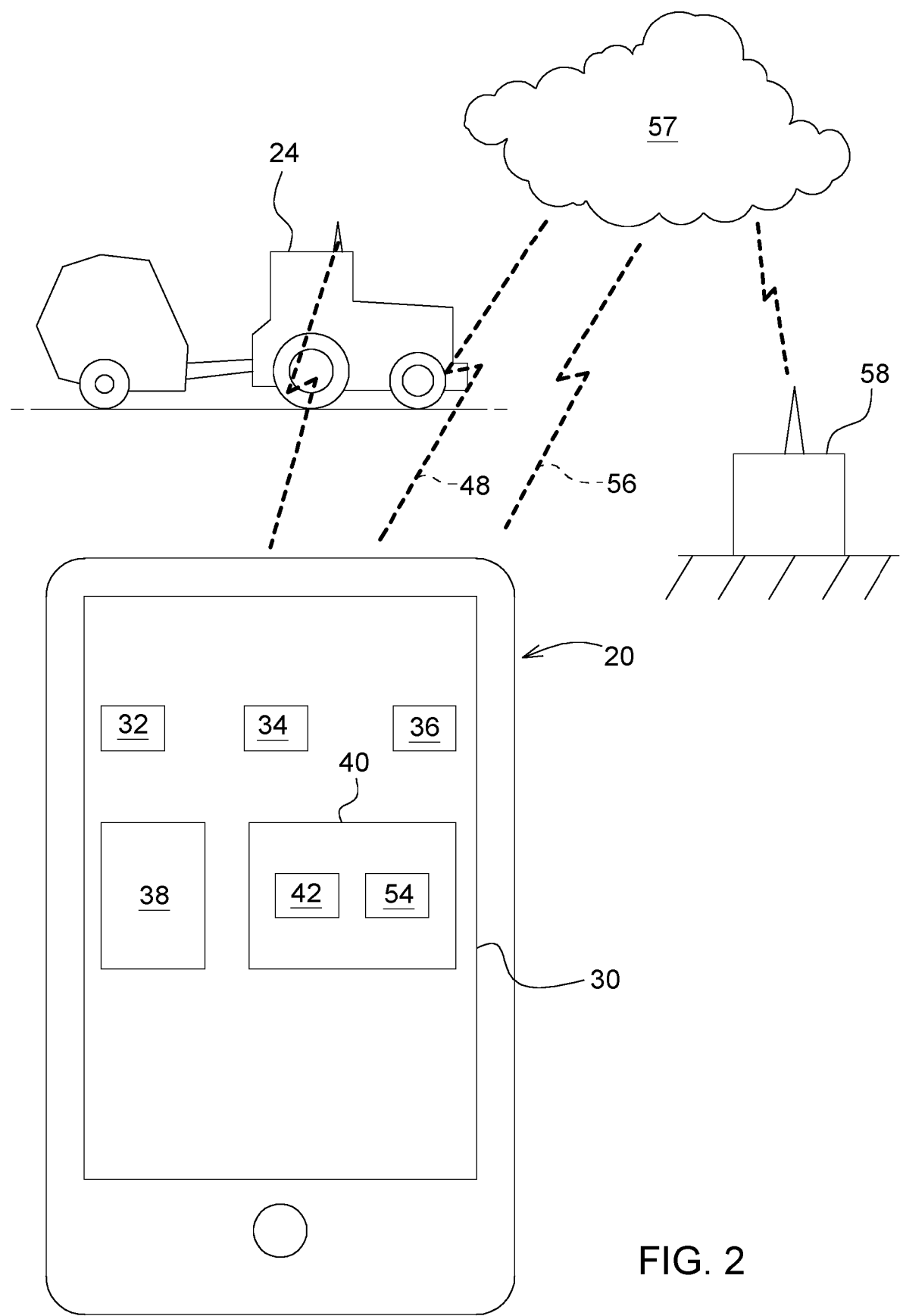
FIG. 2 is a schematic diagram representing a path planning system.

Referring to FIG. 2, the path planning system 20 includes a computing device 30. In one implementation, the computing device 30 is a portable handheld device. For example, the portable handheld device may include, but is not limited to, a smart phone, a tablet, a laptop computer, or some other specialized computer that is easily transportable. In other implementations, the computing device 30 may be integral with and directly incorporated into the harvester implement 24.

In one implementation, the computing device 30 may include a position sensor 32. The position sensor 32 may be configured to receive a location signal 48 providing data related to a location of the computing device 30. For example, the position sensor 32 may include, but is not limited to, a Global Positioning System (GPS) sensor, a cellular receiver, a radio wave receiver, etc. The data related to the location of the computing device 30 may include, but is not limited to, geographic locating data, such as a latitude and longitude or other similar geographic locating data. The computing device 30 may use the geographic location provided by the position sensor 32 to determine or identify elevation data of the harvest area 28, described in greater detail below. The specific manner, process, signal type, etc. used by the position sensor 32 to obtain and process the location signal 48 and/or determine the associated location are known to those skilled in the art and are therefore not described in greater detail herein.

In one implementation, the computing device 30 may further include a data receiver 34. The data receiver 34 may be configured to receive a data signal 56 providing elevation data related to ground surface elevation 50 of the harvest area 28. The data receiver 34 may include, but is not limited to, a cellular receiver, a radio wave receiver, etc. The data receiver 34 and the position sensor 32 may be combined into a single sensor/receiver unit, or may be separate components of the computing device 30. The data signal 56 includes information related to the elevation of the ground surface of the harvest area 28. The specific manner, process, signal type, etc. used by the data receiver 34 to obtain and process the data signal 56 and/or determine the elevation of the ground surface are known to those skilled in the art and are therefore not described in greater detail herein.

In one implementation, the computing device 30 may further include a data transmitter 36. The data transmitter 36 may be configured to send or emit a communication signal for communicating data to the harvester implement 24. For example, the data transmitter 36 may send or communicate the harvest path 22 to the harvester implement 24. As such, the communication signal may include data providing geographic coordinates describing the harvest path 22. The harvester implement 24 may then be controlled to follow the harvest path 22, either manually or autonomously, as understood by those skilled in the art. The data transmitter 36 may include, but is not limited to, a cellular transmitter, a radio wave transmitter, etc. The data transmitter 36, the data receiver 34, and the position sensor 32 may be combined into a single unit, or may be separate components of the computing device 30. The specific manner, process, signal type, etc. used by the data transmitter 36 to send or communicate the communication signal are known to those skilled in the art and are therefore not described in greater detail herein.

While the computing device 30 is generally described herein as a singular device, it should be appreciated that the computing device 30 may include multiple devices linked together to share and/or communicate information therebetween. Furthermore, it should be appreciated that the computing device 30 may be located on the harvester implement 24, or may be located remotely from the harvester implement 24. In one implementation, the computing device 30 is configured as a portable handheld device.

The computing device 30 may alternatively be referred to as a computer, a controller, a control unit, a control module, a module, etc. The computing device 30 includes a processor 38, a memory 40, and all software, hardware, algorithms, connections, sensors, etc., necessary to define the harvest path 22. As such, a method may be embodied as a program or algorithm operable on the computing device 30. It should be appreciated that the computing device 30 may include any device capable of analyzing data from various sensors, comparing data, making decisions, and executing the required tasks.

As used herein, "computing device 30" is intended to be used consistent with how the term is used by a person of skill in the art, and refers to a computing component with processing, memory 40, and communication capabilities, which is utilized to execute instructions (i.e., stored on the memory 40 or received via the communication capabilities) to control or communicate with one or more other components. In certain embodiments, the computing device 30 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The computing device 30 may be in communication with other components on the harvester implement 24, such as hydraulic components, electrical components, and operator inputs within an operator station of an associated work vehicle. The computing device 30 may be electrically connected to these other components by a wiring harness such that messages, commands, and electrical power may be transmitted between the computing device 30 and the other components. Alternatively, the computing device 30 may be electrically connected to these other components by a wireless communication system. Although the computing device 30 is referenced in the singular, in alternative embodiments the configuration and functionality described herein can be split across multiple devices using techniques known to a person of ordinary skill in the art.

The computing device 30 may be embodied as one or multiple digital computers or host machines each having one or more processor 38s, read only memory 40 (ROM), random access memory 40 (RAM), electrically-programmable read only memory 40 (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 40 may include any non-transitory/tangible medium which participates in providing data or computer-readable instructions. The memory 40 may be non-volatile or volatile. Non-volatile media may include, for example, optical or magnetic disks and other persistent memory 40. Example volatile media may include dynamic random access memory 40 (DRAM), which may constitute a main memory 40. Other examples of embodiments for memory 40 include a floppy, flexible disk, or hard disk, magnetic tape or other magnetic medium, a CD-ROM, DVD, and/or any other optical medium, as well as other possible memory 40 devices such as flash memory 40.

The computing device 30 includes the tangible, non-transitory memory 40 on which are recorded computer-executable instructions, including a path planning algorithm 42. The processor 38 of the computing device 30 is configured for executing the path planning algorithm 42. The path planning algorithm 42 implements a method of harvesting the crop material 26 from the harvest area 28 with the harvester implement 24, and more particularly, a method of defining the harvest path 22 for the harvester implement 24 to follow while harvesting the crop material 26 from the harvest area 28.

Figure 3:
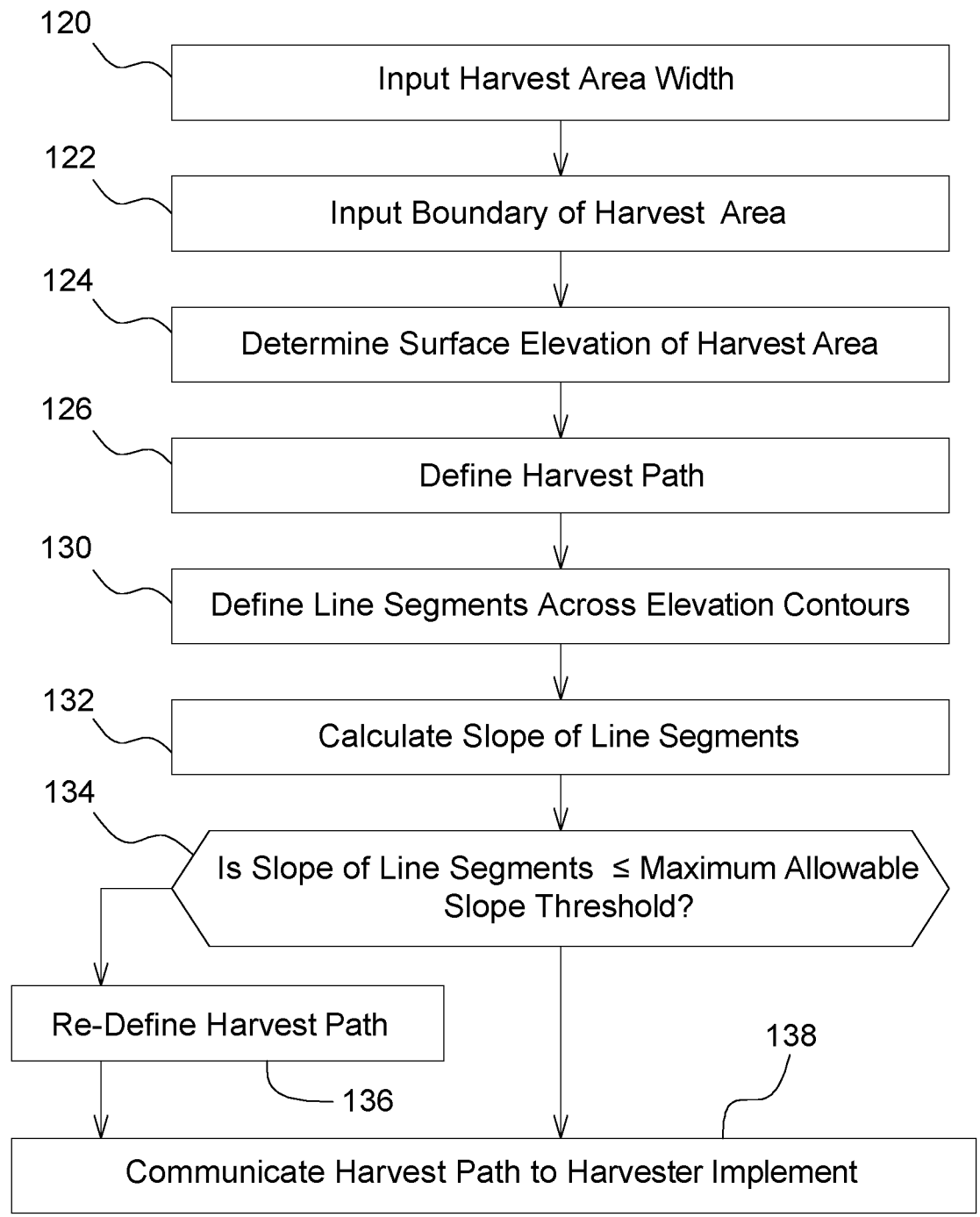
FIG. 3 is a flow diagram representing a method of defining the harvest path.

Referring to FIG. 3, the method described herein may include the computing device 30 receiving a harvest swath width input. The step of inputting the desired harvest width 44 is generally indicated by box 120 shown in FIG. 3. The computing device 30 may receive the harvest swath width input via an input device associated with the computing device 30. The input device may include, but is not limited to, a touchscreen display, a camera, a keyboard, etc. The harvest swath width input may be entered manually by an operator, may be automatically detected in response to a command entered by the operator, or may automatically detected via autonomous operation of the computing device 30. The harvest swath width input defines a desired harvest width 44 for each pass of a harvester implement 24.

The computing device 30 may further receive a boundary 46 input. The step of inputting the boundary 46 is generally indicated by box 112 shown in FIG. 3. The computing device 30 may receive the boundary 46 input via the input device associated with the computing device 30. The boundary 46 input may be entered manually by an operator, may be automatically detected in response to a command entered by the operator, or may automatically detected via autonomous operation of the computing device 30. The boundary 46 input defines a perimeter or boundary 46 of the harvest area 28. The boundary 46 may be defined by the boundary 46 input by selecting a pre-defined field, region of a field, area, space, etc., which is stored in the memory 40 of the computing device 30. Alternatively, the boundary 46 may be defined by the boundary 46 input by entering multiple vertices of a polygonal shape defining or outlining the boundary 46. In yet other alternative implementations, the boundary 46 input may include geographic coordinates describing the boundary 46. It should be appreciated that the boundary 46 input may include data describing the boundary 46 in any suitable manner.

In one implementation, the computing device 30 may receive a location signal 48 via the position sensor 32. As described above, the location signal 48 includes data providing information related to the geographic location and/or coordinates of the computing device 30. The information may be used to select and/or define the boundary 46, and/or to geo-reference the boundary 46 input to specific geographic coordinates.

The computing device 30 may then determine a surface elevation 50 of the harvest area 28 within the boundary 46. The step of determining the surface elevation 50 is generally indicated by box 124 shown in FIG. 3. The surface elevation 50 may include, but is not limited to, a three-dimensional map or geographic coordinate list describing the geographic location and elevation of multiple locations throughout the harvest area 28. For example, the surface elevation 50 may include an elevation map showing at least one elevation contour 52. As is understood by those in the art, and elevation counter establishes defines a geographic location of a line having constant, unchanging ground surface elevation 50. It should be appreciated that the surface elevation 50 may include multiple elevation contours 52, with each elevation contour 52 defining a different ground surface elevation 50. Alternative, the surface elevation 50 may include a data set 54 describing multiple geographic point locations, including for example, a latitude, a longitude, and an elevation for each point location. The computing device 30 may use the data set 54 to generate one or more elevation contours 52 as is understood by those skilled in the art.

In one implementation, the computing device 30 may determine the surface elevation 50 by referencing maps and/or data sets 54 stored in the memory 40 of the computing device 30. For example, the computing device 30 may include three dimensional maps and/or data sets 54 for a region or area including the harvest area 28. The computing device 30 may access the data from the memory 40 to determine the surface elevation 50 of the harvest area 28.

In another implementation, the computing device 30 may determine the surface elevation 50 by receiving the data signal 56 with the data receiver 34. As described above, the computing device 30 may be equipped with the data receiver 34 configured for receiving the data signal 56. The data signal 56 includes elevation data related to the ground surface elevation 50 of the harvest area 28. The data receiver 34 may receive the data signal 56 from a remote source 58, such as but not limited to the internet, a cloud based storage system 57, a central computing location, etc. The elevation data included in the data signal 56 may include, but is not limited to, a three-dimensional map of the harvest area 28 and/or a data set 54 describing multiple geographic point locations within the harvest area 28, including for example, a latitude, a longitude, and an elevation for each point location.

The computing device 30 may then define the harvest path 22. The step of defining the harvest path 22 is generally indicated by box 126 shown in FIG. 3. As described above, the harvest path 22 is the path or route the harvester implement 24 may follow while harvesting the crop material 26 within the harvest area 28. The harvest path 22 is defined to substantially parallel the at least one elevation contour 52 based on the harvest swath width input. As used herein, the term "substantially parallel" and similar phrases used to describe the harvest path 22 should be interpreted to include orientations that are closer to parallel than perpendicular. It should be appreciated that the ground surface elevation 50 throughout the harvest area 28 is not consistent, and that it may not be possible to remain precisely parallel with the ground contour for each pass of the harvester implement 24 at the harvest width. As such, the computing device 30 may define the harvest path 22 to be as close as possible to parallel to the elevation contours 52, while still maintaining an optimum harvest coverage throughout the harvest area 28. Additionally, because the elevation contour 52 may vary left or right from the harvest path 22, it should be appreciated that the harvest path 22 may be generally straightened relative to the elevation contours 52. The computing device 30 may define the harvest path 22 using a path planning algorithm 42, as understood by those skilled in the art, that is programmed to emphasize orientation of the harvest path 22 to be parallel to the elevation contours 52 while establishing multiple passes at the desired harvest width 44.

The computing device 30 may define the harvest path 22 to include multiple side-by-side passes for the harvester implement 24. For example, referring to FIG. 1, a first pass 50 is shown adjacent to a second pass 62. It should be appreciated that the number of passes will vary, and is dependent upon the size of the harvest area 28 and the desired harvest width 44. Each of these respective passes may be offset the desired harvest width 44 so that the harvester implement 24 does not overlap with portions of the harvest area 28 that have been previously harvested, or so that no crop material 26 is left un-harvested or standing in the harvest area 28. In order to define the multiple passes of the harvest path 22, the computing device 30 may define the harvest path 22 to increment from being substantially parallel to a first elevation contour 52A to being substantially parallel to a second elevation contour 52B that is spaced one desired harvest width 44 from the first elevation contour 52. Each subsequent pass of the harvest path 22 may be oriented to as to be either uphill or downhill from the previous pass, while also being adjacent to the previous pass. In other words, the harvest path 22 may be slowly incremented uphill or downhill while remaining substantially parallel with the elevation contours 52.

By defining the harvest path 22 as described herein, the computing device 30 may define the harvest path 22 such that the harvester implement 24 may only need to ascend a hill once. By doing so, the harvest path 22 may be defined to include an overall elevation gain that is less than an overall elevation gain of an alternative harvest path 22 arranged substantially perpendicular to the elevation contours 52. Because more energy is required to ascend a hill then traverse across flat ground or descent a hill, reducing the overall elevation gain of the harvest path 22 may reduce the amount of energy required to power the harvester implement 24, thereby reducing operating costs to harvest the crop material 26.

Figure 4:
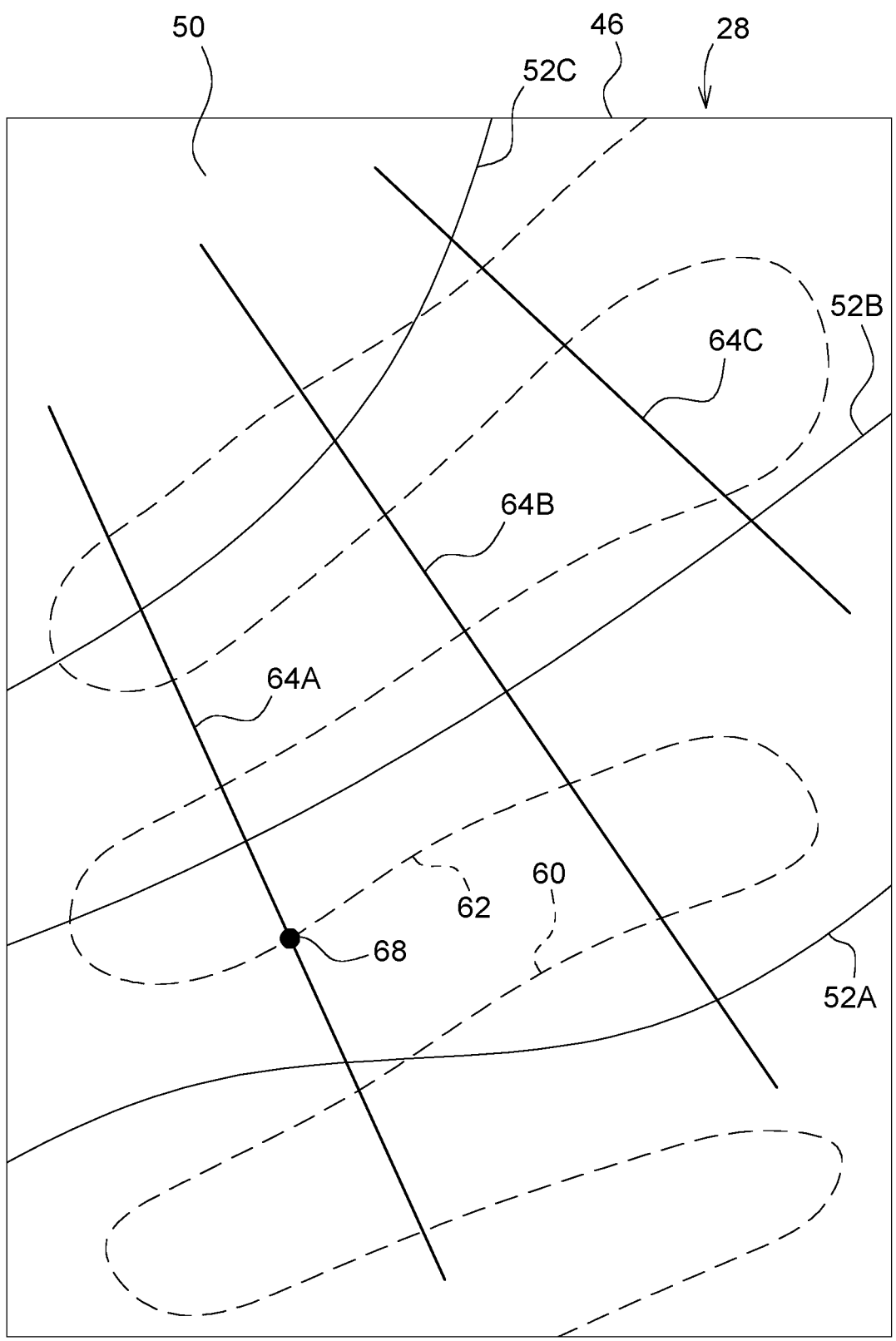
FIG. 4 is a schematic plan view of a portion of the harvest area showing elevation contours and the harvest path.
Figure 5:
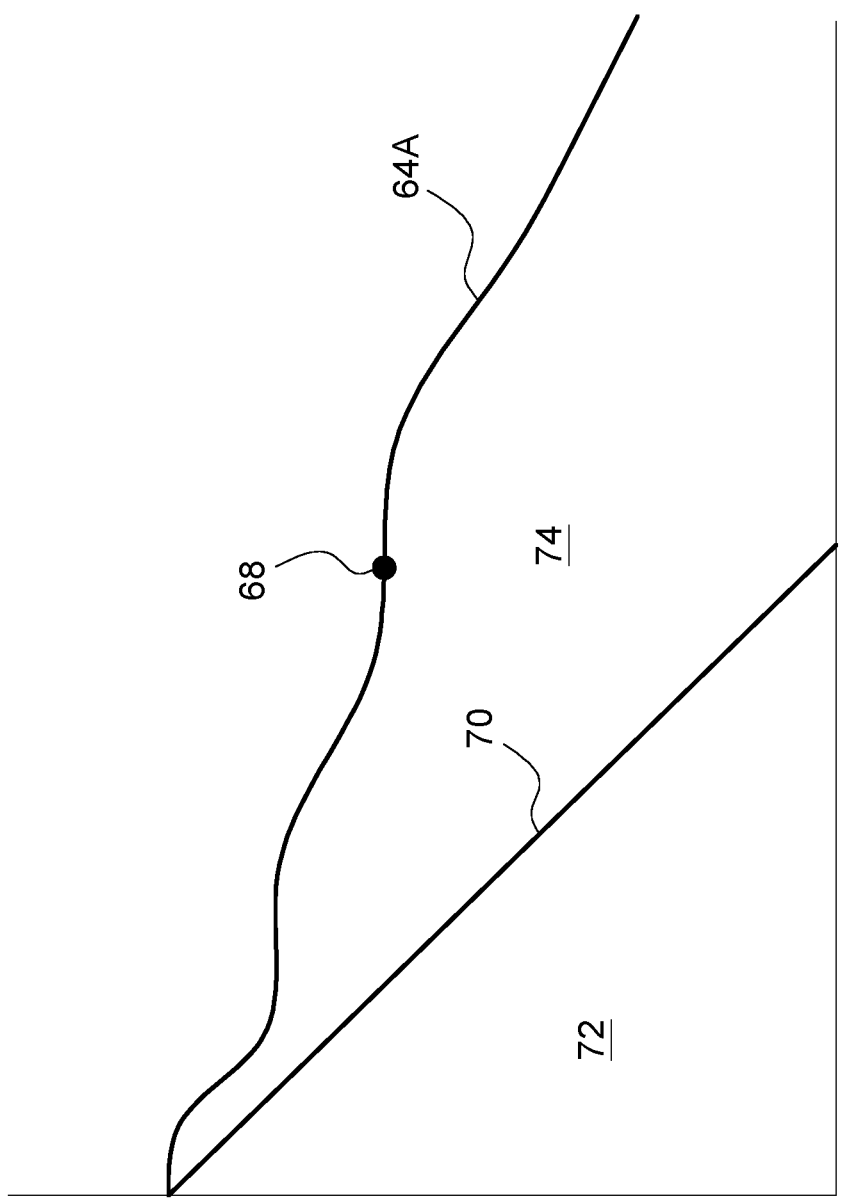
FIG. 5 is a schematic profile view of the harvest area showing the ground surface elevation along a line segment shown in FIG. 4.

Referring to FIGS. 4 and 5, the path planning algorithm 42 may be configured to avoid excessive cross slopes 66 along the harvest path 22. In order to do so, the computing device 30 may define multiple line segments 64A, 64B, 64C extending across the harvest area 28, with each line segment 64A, 64B, 64C extending across the surface elevation 50 in a direction substantially perpendicular to the elevation contours 52. The step of defining the line segments 64A, 64B, 64C is generally indicated by box 130 shown in FIG. 3. The computing device 30 may then calculate a slope 66 of each respective one of the line segments 64A, 64B, 64C. The step of calculating the slope 66 of each line segment is generally indicated by box 132 shown in FIG. 3. The slope 66 of each respective line segment 64A, 64B, 64C may generally reflect the cross slope 66 of the harvest path 22 at the point where the line segment 64A, 64B, 64C crosses the harvest path 22.

The computing device 30 may then compare the respective slope 66 of each of the line segments 64A, 64B, 64C to a maximum allowable slope threshold 70. The step of comparing the slope 66 of each of the line segments 64A, 64B, 64C to the maximum allowable slope threshold 70 is generally indicated by box 134 shown in FIG. 3. The maximum allowable slope threshold 70 may include a value indicating a risk of overturning if exceeded. In other words, exceeding the maximum allowable slope threshold 70 may present a risk of the harvester implement 24 overturning. The value of the maximum allowable slope threshold 70 will vary depending upon each specific application and/or configuration of the harvester implement 24. Referring to FIGS. 4 and 5, the point 68 represents a location at which line segment 64A crosses the harvest path 22. The slope 66 at point 68 is generally shown in FIG. 5.

The computing device 30 may compare the respective slope 66 of each line segment 64A, 64B, 64C to the maximum allowable slope threshold 70 to determine if the slope 66 of the line segment 64A, 64B, 64C is equal to or less than the maximum allowable slope threshold 70, such as shown below the maximum allowable slope threshold 70 in region 72 in FIG. 5, or if the slope 66 of the line segment 64A, 64B, 64C is greater than the maximum allowable slope threshold 70, such as shown above the maximum allowable slope threshold 70 in region 74 in FIG. 5. When computing device 30 determines that the respective slope 66 of any one of the line segments 64A, 64B, 64C is greater than the maximum allowable slope threshold 70, then the path planning algorithm 42 may re-define the harvest path 22 to traverse either a more uphill route or a more downhill route relative to the at least one elevation contour 52. The step of re-defining the harvest path 22 is generally indicated by box 136 shown in FIG. 3. The computing device 30 may re-define the harvest path 22 such that the cross slope 66 along the harvest path 22 is less than the maximum allowable slope threshold 70. By doing so, the harvest path 22 may no longer be precisely parallel with the elevation contours 52, but is still substantially parallel with the elevation contours 52 while minimizing the risk of the harvester implement 24 overturning on an excessive cross slope 66.

Referring to FIG. 2, once the computing device 30 has defined the harvest path 22, the method may include the computing device 30 communicating the harvest path 22 to the harvester implement 24 with the data transmitter 36. The step of communicating the harvest path 22 to the harvester implement 24 is generally indicated by box 138 shown in FIG. 3. For example, if the computing device 30 is embodied as a portable handheld device, such as but not limited to a smart phone, then the computing device 30 may be equipped with the data transmitter 36 for communicating or sending the harvest path 22 to the harvester implement 24. The harvester implement 24 may be equipped with a respective controller for receiving the harvest path 22. An operator may then maneuver the harvester implement 24 along the harvest path 22. In other implementations, the harvester implement 24 may autonomously control the harvester implement 24 to follow the harvest path 22.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A path planning system for harvesting a crop material, the path planning system comprising:
   a computing device including a processor and a memory having a path planning algorithm stored thereon, wherein the processor is operable to execute the path planning algorithm to:
      receive a harvest swath width input defining a desired harvest width for each pass of a harvester implement;
      receive a boundary input defining a boundary of a harvest area;
      determine a surface elevation of the harvest area within the boundary, wherein the surface elevation includes at least one elevation contour establishing a line of constant elevation; and
      define a line segment extending across the surface elevation in a direction substantially perpendicular to the at least one elevation contour;
      calculate a slope of the line segment; and
      define a harvest path for the harvester implement to follow while harvesting the crop material, wherein the harvest path is defined to substantially parallel the at least one elevation contour based on the harvest swath width input.

2. The path planning system set forth in claim 1, wherein the processor is operable to execute the path planning algorithm to compare the slope of the line segment to a maximum allowable slope threshold to determine if the slope of the line segment is equal to or less than the maximum allowable slope threshold, or if the slope of the line segment is greater than the maximum allowable slope threshold.

3. The path planning system set forth in claim 2, wherein the processor is operable to execute the path planning algorithm to re-define the harvest path to traverse one of a more uphill route or a more downhill route relative to the at least one elevation contour when the slope of the line segment is greater than the maximum allowable slope threshold.

4. The path planning system set forth in claim 1, wherein the computing device is a portable handheld device.

5. The path planning system set forth in claim 1, wherein the memory includes elevation data of a region including the harvest area stored thereon.

6. The path planning system set forth in claim 5, wherein the memory includes geographic location data of the region including the harvest area stored thereon.

7. The path planning system set forth in claim 6, wherein the processor is operable to execute the path planning algorithm to receive a geographic location input associated with the boundary and identifying a geographic location of the boundary relative to the elevation data and the geographic location data stored on the memory.

8. The path planning system set forth in claim 1, wherein the computing device includes a position sensor, and wherein the processor is operable to execute the path planning algorithm to receive a position signal from the position sensor indicating a current geographic location of the computing device.

9. The path planning system set forth in claim 8, wherein the computing device includes a data receiver, and wherein the processor is operable to execute the path planning algorithm to receive elevation data via the data receiver providing the surface elevation of the harvest area.

10. The path planning system set forth in claim 1, wherein the processor is operable to execute the path planning algorithm to define the harvest path to include an overall elevation gain of the harvest path that is less than an overall elevation gain of an alternative harvest path arranged substantially perpendicular to the at least one elevation contour.

11. The path planning system set forth in claim 1, wherein the processor is operable to execute the path planning algorithm to define the harvest path to increment from substantially parallel to a first elevation contour to substantially parallel to a second elevation contour that is spaced one desired harvest width from the first elevation contour.

12. The path planning system set forth in claim 1, wherein the computing device includes a data transmitter, and wherein the processor is operable to execute the path planning algorithm to communicate the harvest path to the harvester implement.

13. A method of harvesting a crop material from a harvest area with a harvester implement, the method comprising:
   receiving a harvest swath width input defining a desired harvest width for each pass of the harvester implement, with a computing device;
   receiving a boundary input defining a boundary of a harvest area, with the computing device;
   determining a surface elevation of the harvest area within the boundary with the computing device, wherein the surface elevation includes at least one elevation contour establishing a line of constant elevation; and
   defining a line segment extending across the surface elevation in a direction substantially perpendicular to the at least one elevation contour;
   calculating a slope of the line segment; and
   defining a harvest path for the harvester implement to follow while harvesting the crop material within the harvest area, wherein the harvest path is defined to substantially parallel the at least one elevation contour based on the harvest swath width input.

14. The method set forth in claim 13, further comprising comparing the slope of the line segment to a maximum allowable slope threshold to determine if the slope of the line segment is equal to or less than the maximum allowable slope threshold, or if the slope of the line segment is greater than the maximum allowable slope threshold.

15. The method set forth in claim 14, further comprising re-defining the harvest path to traverse one of a more uphill route or a more downhill route relative to the at least one elevation contour when the slope of the line segment is greater than the maximum allowable slope threshold.

16. The method set forth in claim 13, wherein the step of defining the harvest path includes defining the harvest path to include an overall elevation gain of the harvest path that is less than an overall elevation gain of an alternative harvest path arranged substantially perpendicular to the at least one elevation contour.

17. The method set forth in claim 13, wherein the step of defining the harvest path includes defining the harvest path to increment from substantially parallel to a first elevation contour to substantially parallel to a second elevation contour that is spaced one desired harvest width from the first elevation contour.

18. The method set forth in claim 13, wherein the computing device is a portable handheld device having a data transmitter, and wherein the method further includes communicating the harvest path to the harvester implement.

\* \* \* \* \*